United States Patent
Boshy et al.

(10) Patent No.: US 10,521,824 B1
(45) Date of Patent: Dec. 31, 2019

(54) SYSTEM AND METHOD FOR PERSONALIZED CONTENT RECOMMENDATIONS

(71) Applicant: Outbrain Inc., New York, NY (US)

(72) Inventors: Shlomy Boshy, Nes Ziona (IL); Yaron Galai, New York, NY (US)

(73) Assignee: Outbrain Inc., New York, NY (US)

( * ) Notice: Subject to any disclaimer, the term of this patent is extended or adjusted under 35 U.S.C. 154(b) by 469 days.

(21) Appl. No.: 14/146,279

(22) Filed: Jan. 2, 2014

(51) Int. Cl.
*G06Q 30/02* (2012.01)

(52) U.S. Cl.
CPC ................. *G06Q 30/0269* (2013.01)

(58) Field of Classification Search
None
See application file for complete search history.

(56) References Cited

U.S. PATENT DOCUMENTS

| | | | | |
|---|---|---|---|---|
| 8,799,061 B1* | 8/2014 | Chatterjee | .......... | G06Q 30/0261 705/14.1 |
| 8,965,786 B1* | 2/2015 | Frumkin | ............ | G06Q 30/0242 705/14.41 |
| 2003/0097300 A1* | 5/2003 | Gutta | ................. | G06Q 30/0255 705/14.53 |
| 2003/0101024 A1* | 5/2003 | Adar | ................. | G06F 17/30861 702/187 |
| 2006/0294084 A1* | 12/2006 | Patel | ...................... | G06Q 30/02 |
| 2008/0126176 A1* | 5/2008 | Iguchi | ................ | G06Q 30/0201 705/7.29 |
| 2008/0294524 A1* | 11/2008 | Badros | ................... | G06Q 30/02 705/14.54 |
| 2009/0248599 A1* | 10/2009 | Hueter | ................... | G06Q 10/00 706/20 |
| 2010/0049770 A1* | 2/2010 | Ismalon | ............ | G06F 17/30646 707/765 |
| 2010/0076857 A1* | 3/2010 | Deo | ........................ | G06Q 30/00 705/26.1 |
| 2010/0106606 A1* | 4/2010 | Filice | ..................... | G06Q 30/02 705/14.73 |
| 2010/0169157 A1* | 7/2010 | Muhonen | ............... | G06Q 30/02 705/7.29 |

(Continued)

OTHER PUBLICATIONS

Wan, M. et al. A Random Indexing Approach for Web User Clustering and Web Prefetching. May 2011. PAKDD 2011 International Workshops. [retrieved on Sep. 25, 2019]. Retrieved from Internet: <URL: http://citeseerx.ist.psu.edu/viewdoc/summary?doi=10.1.1.409.1804> (Year: 2011).*

*Primary Examiner* — Michael W Schmucker
*Assistant Examiner* — Bion A Shelden
(74) *Attorney, Agent, or Firm* — Lowenstein Sandler LLP

(57) ABSTRACT

Identifying personalized content recommendations for users in an electronic environment is disclosed. User data comprising information relating to web-based content consumption of multiple users is collected. Multiple user cluster types associated with one or more interest categories are established. A feature vector is generated for each user for each of the multiple user cluster types. Based on the generated feature vectors, the user are grouped into multiple clusters. A grade is generated for each of a plurality of candidate recommendations for each of the clusters. Based on the generated grades, one or more personalized content recommendations for each of the clusters are identified.

9 Claims, 6 Drawing Sheets

(56) References Cited

U.S. PATENT DOCUMENTS

| | | | | |
|---|---|---|---|---|
| 2011/0153423 A1* | 6/2011 | Elvekrog | ............... | G06Q 30/02 705/14.53 |
| 2011/0184806 A1* | 7/2011 | Chen | .................... | G06K 9/6226 705/14.52 |
| 2011/0213661 A1* | 9/2011 | Milana | ................... | G06Q 30/02 705/14.52 |
| 2011/0302165 A1* | 12/2011 | Ishii | ................... | G06Q 30/0282 707/737 |
| 2013/0073568 A1* | 3/2013 | Federov | ............ | G06F 17/30867 707/749 |
| 2013/0124298 A1* | 5/2013 | Li | ....................... | G06Q 30/0241 705/14.42 |
| 2013/0166488 A1* | 6/2013 | Yang | ........................ | G06N 5/02 706/46 |
| 2013/0179252 A1* | 7/2013 | Dong | ............... | G06F 17/30873 705/14.43 |
| 2013/0290110 A1* | 10/2013 | LuVogt | ................... | G06F 17/30 705/14.66 |
| 2013/0325627 A1* | 12/2013 | Kimmerling | ...... | G06F 17/30386 705/14.66 |
| 2014/0164994 A1* | 6/2014 | Myslinski | ............... | G06F 1/163 715/808 |
| 2014/0180829 A1* | 6/2014 | Umeda | .............. | G06Q 30/0273 705/14.69 |
| 2014/0258027 A1* | 9/2014 | Veugen | .............. | G06Q 30/0278 705/26.7 |
| 2014/0372250 A1* | 12/2014 | Dugan | ............... | G06Q 30/0631 705/26.7 |
| 2015/0006280 A1* | 1/2015 | Ruiz | ...................... | G06Q 30/00 705/14.45 |
| 2015/0112801 A1* | 4/2015 | Nice | .................. | G06Q 30/0269 705/14.53 |
| 2015/0112918 A1* | 4/2015 | Zheng | .................... | G06Q 30/02 706/48 |
| 2015/0142785 A1* | 5/2015 | Roberts | ............ | G06F 17/30528 707/723 |
| 2016/0071170 A1* | 3/2016 | Massoulie | ......... | G06Q 30/0282 705/26.7 |

* cited by examiner

SYSTEM AND METHOD FOR PERSONALIZED CONTENT RECOMMENDATIONS

TECHNICAL FIELD

The present disclosure relates to content recommendations and, more particularly, to a technique of providing personalized content recommendations to every user.

BACKGROUND

In the electronic content publishing industry, the onus of revenue-generating activity is shifting from randomly releasing interruptive and irrelevant topics to providing integrated high-quality content that is interesting, helpful and trustworthy to readers or users. The electronic content publishing industry has not kept pace with this paradigm shift, and digital solutions that natively support content personalization are lacking. In the electronic content publishing industry, it is desirable for a content publisher (e.g., a website provider) to present users not only with personalized content in an initial form (e.g., a webpage), but also provide users of that content with additional "recommended" content. In this regard, it should be a goal of the content publisher to provision personalized content recommendations that are interesting and relevant to the user. This will have the effect of increasing the user's consumption of the recommended content, achieving a higher level of user engagement while increasing the content publisher's revenue.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
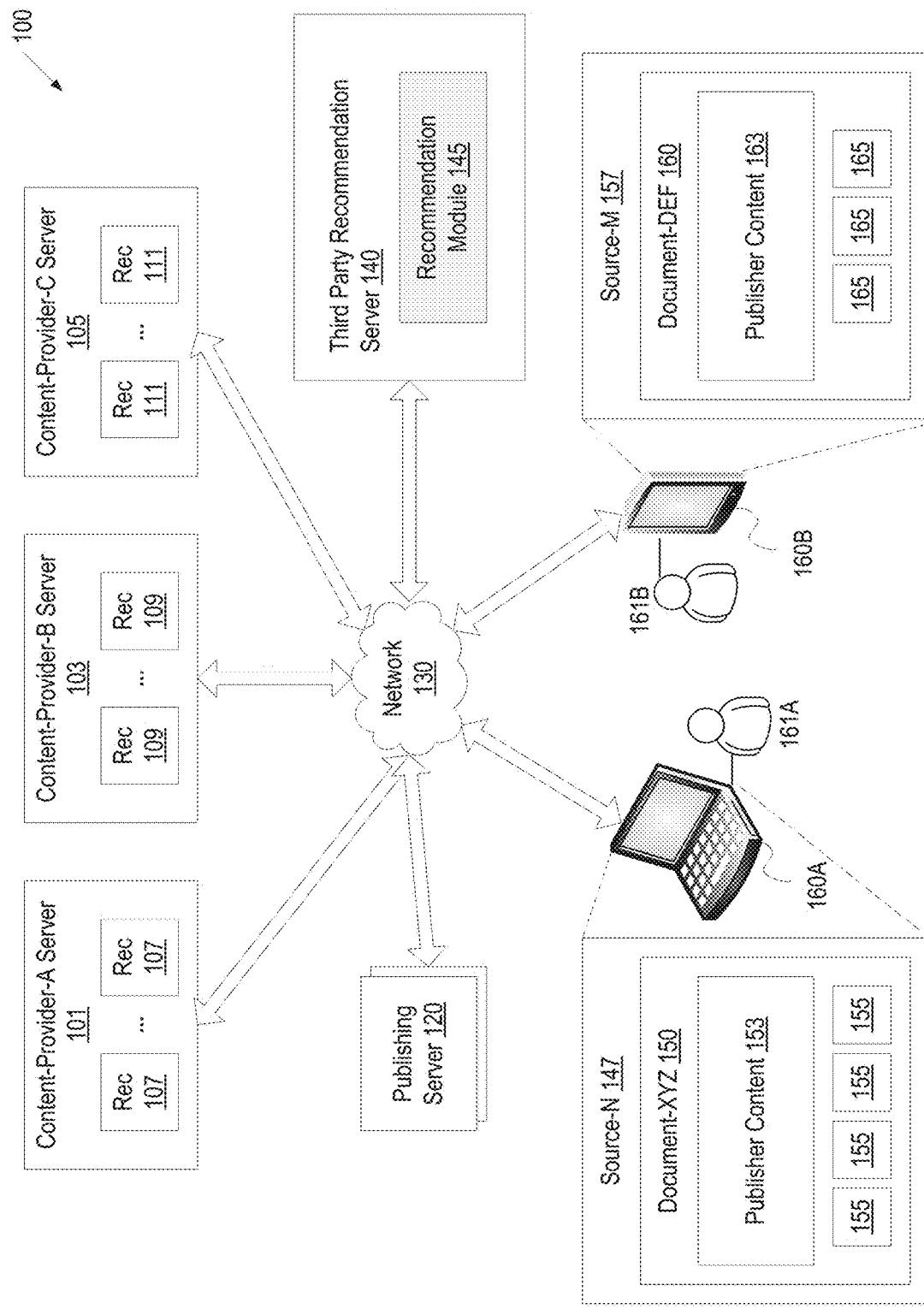
FIG. 1 illustrates an example system architecture in which examples of the present disclosure can be implemented.

A system and method for identifying personalized content recommendations for provisioning to a user is described, according to various implementations. Content providers publishing content via a document may wish to provide a content recommendation to a user of the website. A content recommendation or recommendation hereinafter refers to a representation of digital content. A recommendation can include one or more text, links, thumbnails, images, icons, document, file, etc. A document hereinafter refers to webpage, a mobile application graphical user interface (GUI), etc. For example, a content provider, such as a news web site, may wish to provide a user (e.g., John Smith) visiting the web site with one or more recommendations tailored to that user (also referred to as a "target user"). The content provider (e.g., the news web site publisher) may use a third party recommendation service provider to generate content recommendations that are personalized for provisioning to the target user (e.g., John Smith). In this regard, when a target user visits a webpage, website sections or website front-pages published by a content publisher, a personalized content recommendation may be generated and provided to the target user. As used herein, the term "personalized content recommendation" includes, but is not limited to, a content recommendation that is generated based on data associated with a target user.

According to implementations, user data may include any data relating to a user's electronic or web-based content consumption history, including user action data, user non-action data, and user property data. User action data may include any data associated with a user's electronic actions or activity including, but not limited to, page visits, clicks on a widget or application, scrolling of webpage sections, pointing device (e.g., mouse or keyboard) movements, clicks or other indications, a time of activity on a webpage and/or web site, a listing of web sites visited by a user, languages a user reads, special interest indicators such as "like" indications or "dislike" indications, user explicit data such as categories, etc.

According to implementations, user non-action data includes passively generated data including, but not limited to, social data associated with a user from a social network, viewing a content link (e.g., a recommendation) but not interacting with the link, other personal data associated with the user, etc. According to implementations, user property data includes properties associated with a user including, but not limited to, a geographic location of a user, document properties associated with documents viewed by a user (e.g., document categories, document size (e.g., long documents, short documents, etc.) content type or format (e.g., video, slideshows, audio, articles, games, etc.), etc.

According to implementations, personalized recommendations are generated by collecting user-specific data associated with multiple users to determine interests of the multiple users. The user interests or "features" (e.g., sports, arts, news, technology, etc.) are identified and used to generate multiple user cluster types, wherein each cluster type represents one or more interest categories or features for use in predicting, classifying, or clustering the users. In an implementation, one or more feature vectors are generated for each target user for each of the multiple cluster types. In an implementation, the feature vector provides a representation of each target user's interests as derived from the target user's user-specific data for a particular cluster. Each target user is assigned to one or more clusters based on the generated feature vectors, according to implementations of the present disclosure. In view of the assignments, a cluster mapping is generated including the grouping or clustering of users in multiple feature-based clusters.

According to implementations, one or more personalized content recommendations are assigned to each of the identified user clusters for provisioning to a user mapped to the associated cluster. In an example, when a target user in a particular cluster is identified, the personalized content recommendation associated with the target user's cluster is identified for provisioning to the target user. According to implementations, the personalized content recommendations may be provided to a user as either an organic recommendation or as a paid recommendation and may be delivered in any suitable framework, such as, for example, within a webpage, via a website widget, etc.

FIG. 1 illustrates an example system architecture 100 in which examples of the present disclosure can be implemented. The system architecture 100 can include one or more target user devices 160A-B, one or more content provider servers 101,103,105, one or more destination servers (e.g., publishing servers 120) and one or more third party recommendation servers 140 coupled to each other over one or more networks 130.

Content providers may have recommendations (e.g., recommendations 107,109, 111) they wish to have displayed, for example, in a publisher document (e.g., document-XYZ 150, document-DEF 160). A document 150,160 may be for example, and is not limited to a website homepage, section front, webpage, mobile application user interface (UI), gaming application UI, television application UI, etc. For example, a content provider 101, 103, 105 may have multiple candidate content recommendations 107, 109, 111 that the content provider makes available for provisioning to a target user 161A, 161B via a document 150 (e.g., Sports-News webpage, a BaseballNews webpage) of a source 147. A candidate content recommendation 107,109,111 can be a representation of digital content. Digital content can include, for example, such as, and not limited to, an article, a web blog entry, a social media posting, a data feed, an advertisement, a document (e.g., webpage), digital video, digital movies, digital photos, digital music, social media updates, electronic books (ebooks), electronic magazines, digital newspapers, digital audio books, electronic journals, electronic comic books, software applications, etc. Each content provider can have multiple candidate recommendations 107, 109,111 considered by a recommendation module 145 of a third party recommendation server 140 as a candidate for provisioning to one or more target users 161A, 161B.

A content recommendation host or "publisher" hereinafter refers to an entity and platform hosting destination documents (e.g., webpages, mobile application graphical user interfaces (GUIs), gaming application GUIs, television application GUIs, etc.) that include recommendations 107, 109,111 of the content providers 101, 103, 105. For example, SportsNews, Inc. and BaseballNews, Inc. may be publishers. The publisher platforms can include publishing servers 120. The publisher servers 120 can be application servers that provide one or more applications (e.g., web application, mobile application, desktop application, gaming console applications, television console application, etc.). The publishing servers 120 can be coupled to one or more data stores that store publisher data and/or recommendations of content providers.

According to implementations, the publishers' destination documents 150,160 can be rendered with the recommendations 107,109,111 of the content providers in user devices 160A-B using for example, an application (e.g., web browser, mobile application, desktop application, gaming application, television application, etc.) on the user device 160A-B.

A document 150,160 can be within a source 147,157. The source 147,157 may include, but is not limited to, a publisher's website, a publisher's mobile application, publisher's gaming application, publisher's television application, etc. A destination document 150,160 can include publisher content (e.g., publisher content 153,163). For example, the SportsNews website (e.g., source 147) can include a webpage (e.g., document 150) that contains an article about a baseball game (e.g., publisher content 153).

The publisher destination documents 150,160 can be configured with one or more recommendation opportunities 155,165, which can be populated with recommendations 107,109,111. For example, a document 150 (e.g., Sports-News webpage) may have four recommendation opportunities 155 and a document 160 (e.g. BaseballNews mobile application GUI) may have three recommendation opportunities 165. The recommendation opportunities 155,165 may be populated with personalized recommendations generated by a recommendation module 145 of the third party recommendation server 140.

The content providers may wish to publish their respective recommendations 107,109,111 in widespread locations (e.g., document 150, document 160). The content providers can use the service hosted by the third party recommendation service provider to have the recommendations 107,109, 111 of the content providers served to populate the recommendation opportunities 155,165 in the publisher documents 150,160. The publishers (e.g., SportsNews Inc., BaseballNews, Inc.) can use the service hosted by the third party recommendation service provider to receive recommendations 107,109,111 to populate the recommendation opportunities 155,165 in their respective publisher documents 150,160.

The third party recommendation service provider can host one or more third party recommendation servers 140 to provide the service to the content providers and publishers. The servers 140 include the recommendation module 145 configured to generate one or more personalized content recommendations for provisioning for a target user 161A, 161B via a source 147, 157. The recommendation module 145 is a software component (e.g., a set of instructions residing in a memory) executable by one or more processing devices to perform the personalized content recommendation generating activities described herein (e.g., the methods described in detail in connection with FIGS. 3-4). The instructions of the recommendation module 145 may reside in a memory including any suitable computer readable storage medium, such as volatile memory devices (e.g., random access memory (RAM)), non-volatile memory devices (e.g., flash memory), a magnetic hard disk, a Universal Serial Bus (USB) solid state drive, a local disk, an external disk, and/or other types of memory devices).

The network of content providers can include, for example, several hundred thousand candidate recommendations 107,109,111 that may be stored in one or more data stores that are coupled to the network 130. The architecture 100 can include, for example, several hundred publisher documents 150,160 that are accessed by multiple users 161A-B on various user devices 160A-B.

For example, document 150 may have four recommendation opportunities 155 for provisioning a personalized content recommendation for the target user 161A. When the target user 161A accesses the particular document 150, the recommendation module 145 can generate a set of personalized content recommendations to populate the four recommendation opportunities 155 in the document 150. As each target user 161A-B accesses a document 150,160, the recommendation module 145 can determine an associated one or more personalized content recommendations associated with the particular target user 161A, 161B, in accordance with the methodologies described in detail below.

The networks 130 can include one or more local area networks (LAN), one or more wireless networks, one or more mobile communications networks, one or more wide area networks (WAN), such as the Internet, or similar communication systems, or combinations of such. The networks 130 can include one or more networking and/or computing devices such as wired and wireless devices. In one implementation, not all servers 101,103,105,120,140, and/or user devices 160A-B are directly connected to each other. The networks 130 may be separate networks.

The servers 101,103,105,120,140 can be hosted on one or more machines. The machines can include for example, and are not limited to, any data processing device, such as a desktop computer, a laptop computer, a mainframe computer, a personal digital assistant, a server computer, a handheld device or any other device configured to process data.

A user device 160A-B can be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. For example, user device 160A may be a laptop computer and user device 160B may be a tablet computer.

Figure 2:
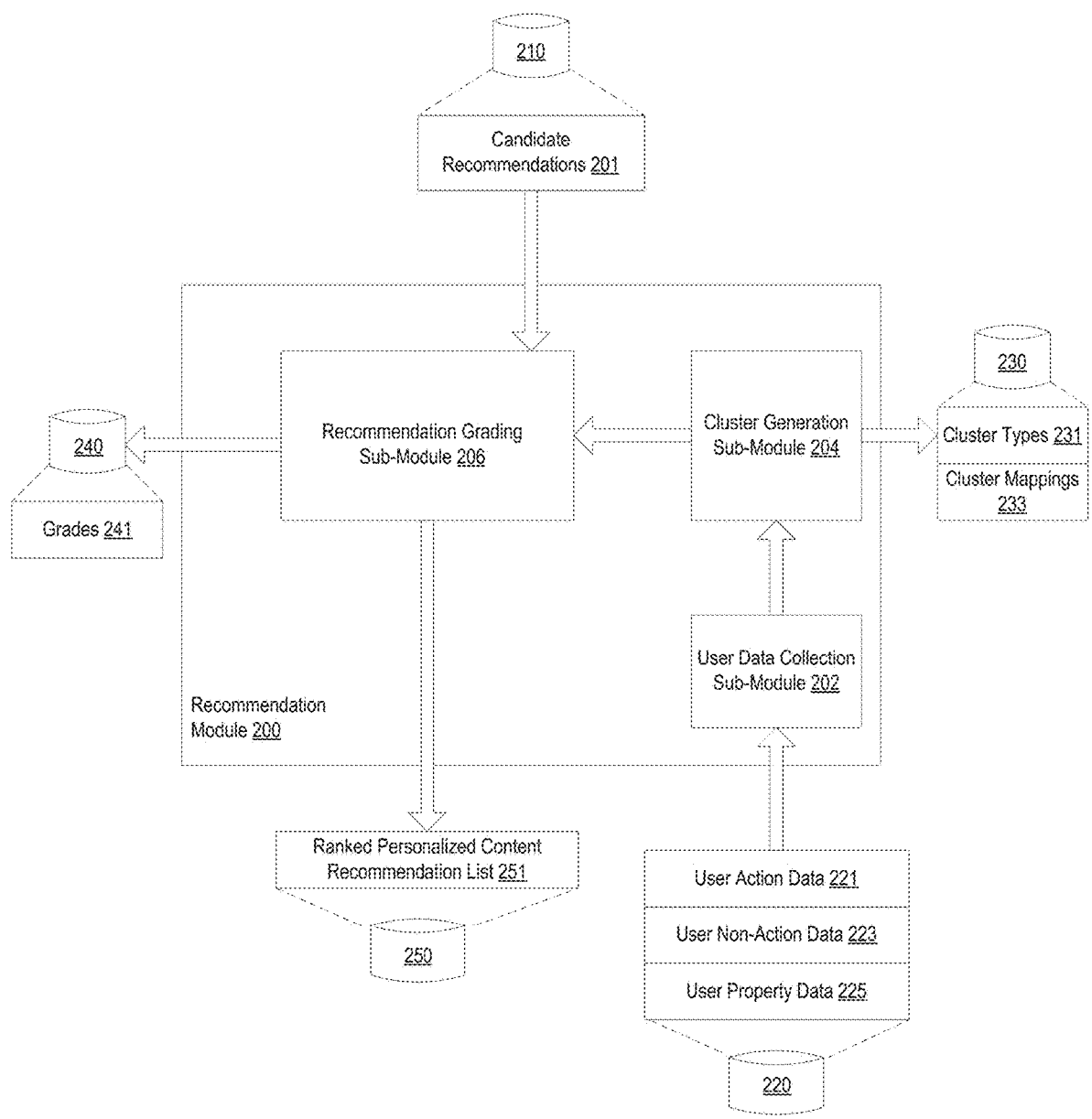
FIG. 2 is a block diagram of a recommendation module, in accordance with various implementations.

FIG. 2 is a block diagram of a recommendation module 200 (e.g., recommendation module 145 of FIG. 1), in accordance with various implementations of the present disclosure. The recommendation module 200 can include a user data collection sub-module 202, a cluster generation sub-module 204, and a recommendation grading sub-module 206. Note that in alternative implementations, the functionality of one or more of the user data collection sub-module 202, the cluster generation sub-module 204, and the recommendation grading sub-module 206 may be combined or divided. Note that in alternative implementations, the functionality of the recommendation module 200 can be separate modules.

The recommendation module 200 can be coupled to one or more data stores 210, 220, 230, 240, 250 that store data. The data stores 210, 220, 230, 240, 250 can be persistent storage units. A persistent storage unit can be a local storage unit or a remote storage unit. Persistent storage units can be a magnetic storage unit, optical storage unit, solid-state storage unit, electronic storage units (main memory), or similar storage unit. Persistent storage units can be a monolithic device or a distributed set of devices. A 'set', as used herein, refers to any positive whole number of items.

The data stores 210, 220, 230, 240, 250 can store input and/or output data. The modules (e.g., the user data collection sub-module 202, the cluster generation sub-module 204, and the recommendation grading sub-module 206) can be coupled to the one or more data stores 210, 220, 230, 240, 250 and can read from and write to the one or more data stores 210, 220, 230, 240, 250.

Data store 210 can store candidate recommendations 201 received, identified by, or otherwise provided to the recommendation module 200 by one or more content providers. The candidate recommendations 201 may be considered by the recommendation module 200 in formulating the personalized content recommendations for the one or more target users. In an implementation, a candidate recommendation 201 may be a representation of digital content. According to implementations of the present disclosure, the candidate recommendation(s) 213 can include, for example, and is not limited to, one or more text, links, thumbnails, images, icons, etc.

According to implementations of the present disclosure, data store 220 is configured to store user data collected by the user data collection sub-module 202. The user data may include user action data 221, user non-action data 223 and user property data 225. The user data may be collected for any quantity of users via any suitable methodology. For example, user-specific data from multiple users may be collected by the user data collection sub-module 202 by storing a user identifier (e.g., a cookie stored on the user's browser) and/or using a user login (e.g., wherein a user is associated with login credentials which enable the collection of user data for that user across multiple devices and browsers).

According to implementations of the present disclosure, user action data 221 may include any data associated with a user's electronic actions or activity including, but not limited to, page visits, clicks on a widget or application, scrolling of webpage sections, pointing device (e.g., mouse or keyboard) movements, clicks or other indications, a time of activity on a webpage and/or web site, a listing of web sites visited by a user, languages a user reads, special interest indicators such as "like" indications or "dislike" indications, user explicit data such as categories, etc.

According to implementations, user non-action data 223 includes passively generated data including, but not limited to, social data associated with a user from a social network, viewing a content link (e.g., a recommendation) but not interacting with the link, other personal data associated with the user, etc.

According to implementations, user property data 225 includes properties associated with a user including, but not limited to, a geographic location of a user, document properties associated with documents viewed by a user (e.g., document categories, document size (e.g., long documents, short documents, etc.) content type or format (e.g., video, slideshows, audio, articles, games, etc.), etc. The user property data 225 collected by the recommendation module 200 may further include registration information, personal information, and/or demographic information pertaining to users and/or groups of users (e.g., age of user groups, geography (e.g., country, state, city) of user groups) and may store the information in one or more data stores (e.g., hard disks, memories, databases, etc.) (e.g., data store 220). In situations in which the implementations discussed herein collect personal information and/or demographic about users, or may make use of personal information and/or demographic information, the user may be provided with an opportunity to control whether the recommendation module 200 is allowed collect the information (e.g., information about a user's social network, social actions or activities, profession, a user's preferences, or a user's current location), or to control whether and/or how to receive content from the content sharing platform that may be more relevant to the user. In addition, certain data may be treated in one or more ways before it is stored or used, so that personally identifiable information is removed. Thus, the user may have control over how, when, and what type of information is collected about the user and used by the recommendation module 200.

According to implementations of the present disclosure, the cluster generation sub-module 204 is configured determine cluster types 231 and cluster mappings 233 based on the user data collected by the user data collection sub-module 202. According to implementations, the cluster generation sub-module 204 may generate any suitable quantity of cluster types 231 for assigning the multiple users to a respective one or more cluster types 231 based on each user's interests as represented by one or more feature vectors, as described below in detail with regard to FIG. 3.

According to implementations of the present disclosure, the recommendation grading sub-module 206 is configured to grade one or more candidate recommendations 201 as it relates to each cluster of users generated by the cluster generation sub-module 204. In an implementation, based on the grades assigned to the multiple candidate recommendations, the recommendation grading sub-module identifies one or more personalized content recommendations associated with the users within a particular cluster. In an example, the one or more personalized content recommendations associated with a cluster (e.g., the candidate recommendations having the highest relative grades) are ranked and ordered on a ranked personalized content recommendation list 251. In an implementation, the ranked personalized content recommendation list 251 may be generated on a per target user basis (e.g., a ranked personalized content recommendation list is generated for each target user) and/or on a per cluster basis (e.g., a ranked personalized content recommendation list 251 is generated for each cluster mapping for application to the target users within the respective cluster mapping).

In implementations of the present disclosure, the recommendation grading sub-module 206 may determine the grades 241 for the candidate recommendations 201 and store the grades 241 in the data store 240. Implementations of generating the ranked personalized content recommendation lists 251 are described in greater detail below in conjunction with FIG. 4 and FIG. 5.

Figure 3:
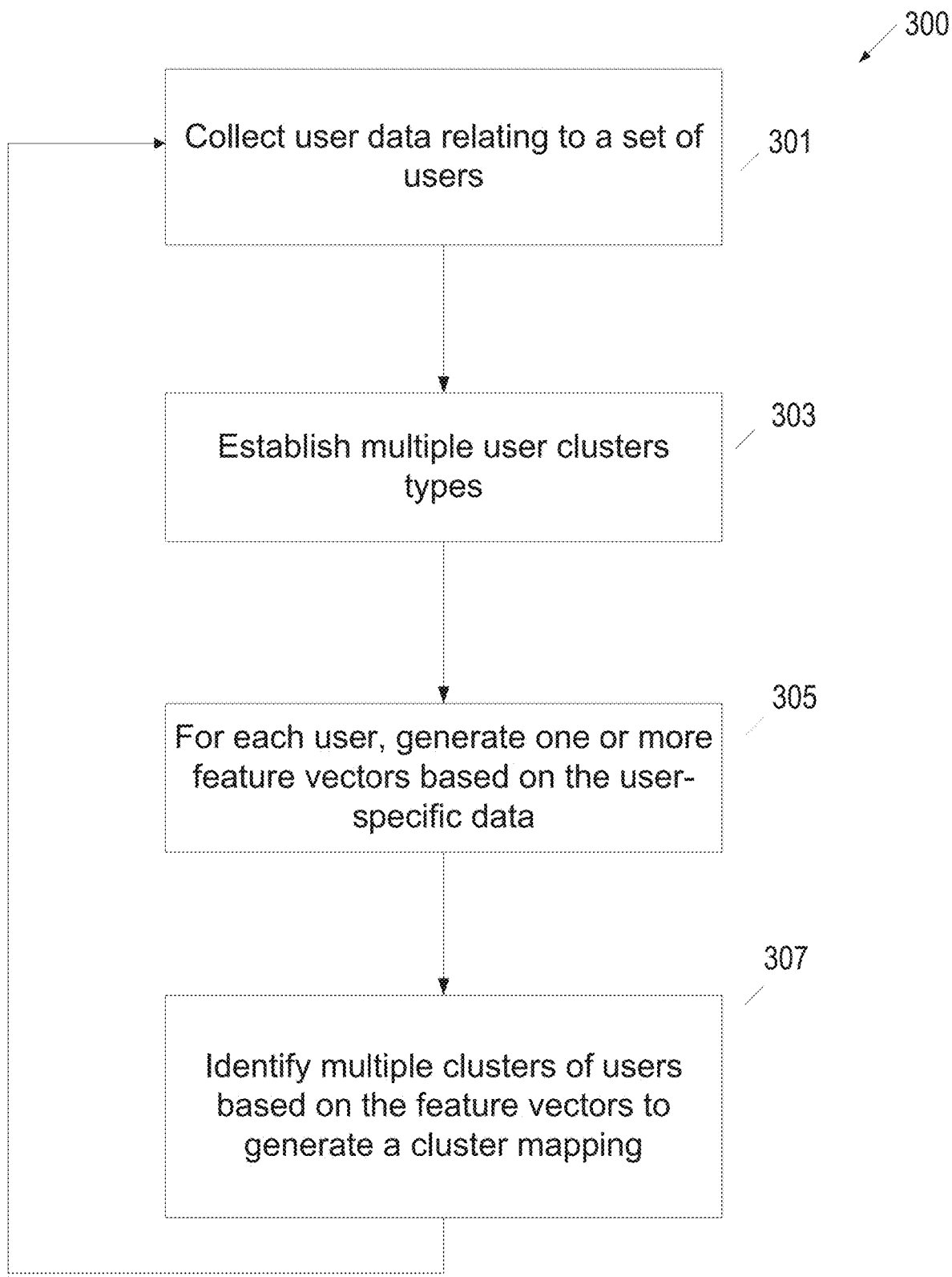
FIG. 3 is a flow diagram of an implementation of a method for generating user cluster mappings.

FIG. 3 is a flow diagram of an exemplary implementation of a method 300 for generating cluster mappings including users grouped in clusters based on their interests or features. The method may be performed by processing logic that may comprise hardware (circuitry, dedicated logic, etc.), software (such as is run on a general purpose computer system or a dedicated machine), or a combination of both. In an implementation, the method 300 may be performed by the recommendation module 145 hosted in a server 140 of FIG. 1 or by the recommendation module 200 illustrated in FIG. 2.

At block 301, the recommendation module collects user data relating to a set of users. In an implementation, the user data may be collected for any quantity of users via any suitable methodology, including the use of user identifiers such as a cookie, user registration, scraping and/or crawling techniques, etc. In implementations, the user data may be collected periodically with any suitable frequency (e.g., every five minutes, every hour, every day, etc.). In implementations, the user data may be collected incrementally and aggregated on a per user basis over time in order to identify user-specific data for each target user. According to an implementation, the user data may be collected using a Hadoop (e.g., map-reduce) framework for distributed, parallel and scalable data collection.

In block 303, multiple user cluster types are established which are based on one or more features (e.g., interests). In an implementation, one or more features are used to define each cluster type. For example, a first cluster type may be established which is defined by an "arts" feature and a "sports" feature. In this example, the first cluster type is intended to include users having an interest in both arts and sports. It is noted that any quantity or combination of features may be used to define or establish a cluster type.

According to implementations of the present disclosure, multiple cluster types may be established based on "general" features (e.g., sports, technology, arts, etc.) that are broader and less specific in scope. In another example, "deep" cluster types may be established which are based on one or more specific features (e.g., users that are Dodgers fans living in California; users consuming content relating to U.S. Civil War history, etc.). According to implementations, general cluster types generally include a greater quantity of users in the cluster than "deep" cluster types, due to the relative breadth of the feature or features used to define the cluster type.

In block 305, one or more feature vectors are generated for each user based on the user-specific data. A feature vector reflects a value of each feature associated with a particular clustering type to a particular user. In an embodiment, each feature vector value (for example, a number on a scale between 0 and 1) indicates how much the user likes a particular interest category. The feature vector value may be generated by analysis of user action data, such as, for example, the categories of documents the user has visited, the length of time the user spends reviewing, interacting with, and/or reading a document, etc. In an example, a first cluster type may be established based on the following three features: arts, sports and technology. In this example, for a given user (i.e., John Doe), a feature vector is generated which provides a value representing John Doe's interest and engagement in each of the arts features, the sports features, and the technology features of the first cluster type. For example, a feature vector for John Doe may be generated indicating that John Doe has a 60% interest level in arts, a 30% interest level in sports and a 10% interest level in technology.

In implementations of the present disclosure, a feature vector for a particular user based on user data associated with a website (e.g., a news-based website) may be normalized by comparing the feature vector with a feature vector for an average user of the website. For example, assume that the average users of a first website consume a large amount of content about "technology" on the first website and a comparatively small amount of content about "news" on the first website. If a particular user consumes a large amount of "news" content on the first website, the feature vector for the particular user may be normalized to reflect that he or she consumes more "news" content than "technology" content than the average user of the first website.

In implementations of the present disclosure, a feature vector for a particular user may be normalized to account for editorial biases of the publisher (e.g., a bias based on a degree of consumption as a function of the placement of the content on a web page). For example, consumption data reflecting a user's consumption of an article placed within a top header of the web page may be assigned a lower weight in determining the feature vector than data reflecting consumption of an article appearing "below the fold" of the web page, in order to account for content position biases.

In implementations of the present disclosure, a feature vector for a particular user may be normalized by filtering out user data relating to consumption of content in certain categories (e.g., a "News" category, etc.) as being non-indicative of a consistent personal user interest.

In an implementation, the feature vector may be normalized to take into account the age of the consumption data (e.g., when the content was consumed by the user) such that older user interactions are given a lower weight or consideration than newer user interactions. In an implementation, for certain content categories (e.g., science), aging may be relatively slower than other categories (e.g., stock market information, news). In such instances, the relatively slow aging of the content may be taken into account in generating the feature vector, such that the weight of the consumption data relating to the slow-aging content is not reduced or is reduced less than consumption data relating to fast-aging content.

In block 307, multiple clusters are identified and/or formed such that each user of the set of users is assigned to one or more clusters based on the feature vectors associated with the set of users. A cluster mapping is formed which identifies the user clusters grouped based on a similarity of their interests as represented by each user's feature vector(s). In an implementation, the clusters may be defined by including users having feature vectors that are within a threshold distance from a center of the cluster. This ensures similarity of users within a cluster and sufficient differentiation of each cluster from other clusters. The threshold distance may be any suitable distance and may be adjustable. In an implementation, clustering success may be measured by determining an average distance or median distance within the clusters as compared to the distances between the feature vectors and the cluster center.

According to implementations of the present disclosure, the cluster mapping including the multiple clusters may be generated at one or more differing resolution levels, depending on the depth of the associated user data. In an implementation, the clusters may be generated at an aggregated measures resolution level, wherein users are clustered by high level characteristics or parameters including, but not limited to, the time at which users consume content, the geography of the users, the categories of the content consumed by the users, websites visited by the users, types of content consumed by the users (e.g., long or short documents, video, articles, etc.). In an implementation, the average time at which maximum content consumption by the user occurs may be identified as a most common or frequent time of consumption of content of the user. In an implementation, the geography of a user may be identified as the most common or frequent geographic area or location of a user at the time of the consumption of content. In an implementation, the travel of the user may be taken into account by performing an aged average of multiple geographies of the user in order to determine a current location of the user as the user travels from location to location.

In an implementation, the clusters may be generated at a term/topic resolution level, wherein users are clustered by terms (e.g., words, expressions, etc.) and/or topics of the content consumed by the users. In an implementation, the clusters may be generated at a document resolution level, wherein users are clustered by the specific documents (e.g., as identified by a specific document identifier) consumed by the users.

According to implementations of the present disclosure, the clustering of the users may be performed according to various clustering techniques, such as a k-means++ clustering method or a k-clustering method. In implementations, in generating the clusters, various distance measures may be employed, such as, for example, cosine similarity (e.g., a measure of similarity between two feature vectors of an inner product space that measures the cosine of an angle between the feature vectors), a Jaccard index for binary measures, etc.

According to implementations, a user may be assigned to or included within a single cluster per clustering method, or fuzzy clustering may be performed wherein a user is assigned to multiple clusters in different probabilities (e.g., a first user is in cluster 1 with a 60% probability and in cluster 2 with a 40% probability).

As shown by the feedback loop in FIG. 3, the method 300 may be executed iteratively, such that the operations in blocks 301-307 are performed repeatedly over a period of time at a frequency that may be established and/or adjusted by a user (e.g., an administrator) of the recommendation module.

Figure 4:
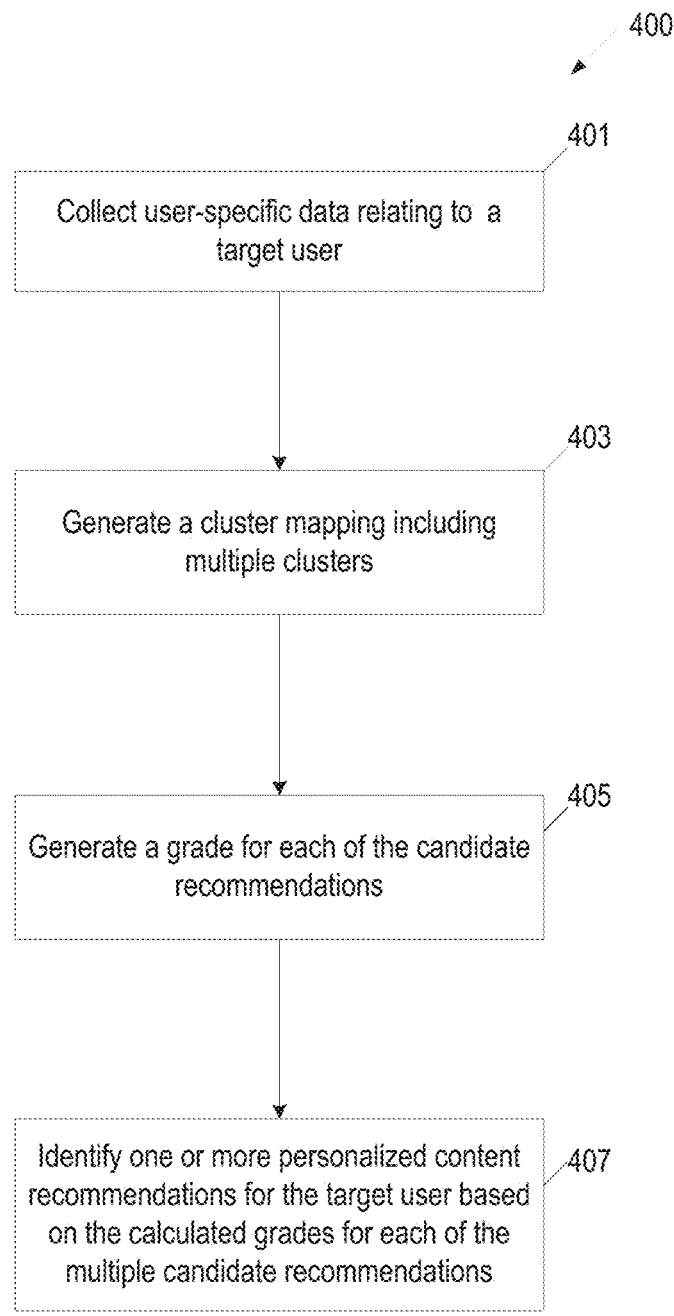
FIG. 4 is a flow diagram of an implementation of a method for generating personalized content recommendations for clusters of users.

FIG. 4 is a flow diagram of an implementation of a method 400 for generating personalized recommendations for clusters of users. The method may be performed by processing logic that may comprise hardware (circuitry, dedicated logic, etc.), software (such as is run on a general purpose computer system or a dedicated machine), or a combination of both. In one implementation, the method 400 may be performed by the recommendation module 145 hosted in a server 140 of FIG. 1 or by the recommendation module 200 illustrated in FIG. 2.

At block 401, the recommendation module collects user data for multiple users including a target user. As described in detail above, in block 403, the recommendation module generates a cluster mapping for the users. The cluster mapping includes multiple clusters of users defined by the feature vectors generated for the users based on the user data collected in block 401. In an implementation, the target user is included within at least one of the multiple clusters. In an implementation, new and/or updated clusters may be generated in block 403 iteratively at any given frequency (e.g., once a day). In an implementation, a new user (e.g., a user that has not yet been assigned to a cluster) may be classified or assigned to a cluster "on the fly" by assigning the new user to a cluster having a cluster center which is nearest to a feature vector generated based on the new user's available user data (e.g., user data collected during a current session, web-based interaction, registration, etc.).

Having established the multiple clusters that include users grouped together based on the similarity of their interests (as represented by the feature vectors), in block 405, the recommendation module generates a grade for each of multiple candidate recommendations for each of the multiple clusters.

According to implementations of the present disclosure, the grading of the multiple candidate recommendations in block 405 may be performed using the user clusters and user data as inputs. In an implementation, the age of the consumed content of the user data may be considered in grading the candidate recommendations. For example, user data representing the consumption of content which ages relatively quickly (e.g., news, stock tickers) may be discarded during the grading process.

According to implementations, user data for each user in a given cluster associated with each candidate recommendation is aggregated to determine a measure (e.g., a number) of interactions (e.g., website/web page visits, listings, impressions, click-through rates from the candidate recommendation) by the users in the cluster for each candidate recommendation. In an implementation, this provides specific data (e.g., a number of visits, listings, impressions, clicks, etc.) about each recommendation in any cluster. In an implementation, the user data may be updated incrementally in a scalable fashion to enable the updating and refreshing of the clusters and recommendation grading. Advantageously, in an implementation, new and/or updated personalized content recommendations may be identified for the clusters periodically at any given frequency (e.g., every hour) to capture and reflect the changes in interests and content consumption of the users.

In implementations of the present disclosure, the recommendation module may be configured to employ "fuzzy recommendation" generation, wherein, for each cluster, data associated with a performance of each recommendation in that cluster is saved and stored. In implementations, a set of clusters within a threshold distance of a user's feature vector may be identified (e.g., a center of each of the set of clusters is less than or equal to the threshold distance from the user's feature vector). In order to identify a personalized content recommendation for the user, the performance data for the multiple candidate recommendations for the identified set of clusters is aggregated and weighted by the distance between each cluster's center and the user's feature vector. In implementations, the above-described methods may both be performed in order to generate different personalized content recommendations for each user in a cluster, while saving and storing user data on a per cluster basis, thereby achieving a scalable methodology.

According to implementations of the present disclosure, any suitable grading methodology may be employed in grading the candidate recommendations for a given cluster. In an implementation, a grading methodology may be employed wherein a grade is calculated based on one or more grade components determined for the candidate recommendations. In an implementation, a first exemplary grade component may include a measurement of a key performance indicator (KPI) associated with user engagement (referred to as a "user engagement indicator"), such as, for example, click-through rate (CTR), a revenue per thousand impressions (RPM), time on a web page, user browsing on a web page, a number of returning users, etc.). The user engagement indicator grade component may be employed to identify candidate recommendations having the highest user engagement indicator (e.g., highest CTR) in a cluster over a period of time. In an implementation, the candidate recommendation having the highest user engagement indicator value may be identified by determining a highest absolute user engagement indicator value of the multiple candidate recommendations for the users in a particular cluster. In an implementation, the candidate recommendation having the highest user engagement indicator value may be identified by determining a user engagement indicator value for a candidate recommendation based on the users in a particular cluster relative to a "global" user engagement indicator value measurement of the candidate recommendation over all clusters (e.g., by dividing a user engagement indicator value for the users in a particular cluster by the "global" user engagement indicator value across all clusters for the candidate recommendation).

In an implementation, another grade component may be determined wherein candidate recommendations may be graded by determining a measure of a quantity of visits to the candidate recommendation by users from the cluster in a period of time. In an example, the grade may be based on an absolute number of visits by the users in a particular cluster (e.g., by dividing a number of unique users in a particular cluster who visited a candidate recommendation by a number of users in the cluster). In another example, the grade may be based on a relative number of visits by the users in the cluster as compared to a "global" number of visits by users in all of the clusters (e.g., by dividing a percentage of users in a particular cluster who visited the candidate recommendation by a percentage of "global" users in all clusters who visited the candidate recommendation).

In an implementation, a component of the overall grade for a content recommendation may include a measure of the age of the candidate recommendation. In an example, a non-linear function may be established to estimate a value in a range (e.g., from [0, 1]) of an age of the candidate recommendation. In an implementation, an aging function may be calculated as an exponential decay of an importance of older user actions, such as in the following example:

$$aged\_listings = listings * (alpha \hat{} number\_of\_days\_passed\_since\_action)$$

$$aged\_clicks = clicks * (alpha \hat{} number\_of\_days\_passed\_since\_action)$$

For example, an alpha=0.7 can be calculated for different aging strengths and for hours instead of days, etc. In this implementation, content recommendations having an age value that exceeds an age threshold value may be discarded. Other suitable methodologies for "aging" the candidate recommendations may also be employed.

In an implementation, a component of the overall grade for a content recommendation may include a measure of the reliability of the user data. The data reliability grade component may include an assessment of the reliability of the data used to determine the user engagement indicator values and user visit values. For example, a reliability function can be calculated as an internal confidence level of x standard deviations down, assuming a binomial distribution of a click (a user click being considered a successful impression). This ensures that recommendations based on less data get a lower grade.

According to implementations of the present disclosure, the recommendation module may be configured to determine a grade for each candidate recommendation by calculating two or more of the above-described grade components and normalize each grade components into a range (e.g., a range of [0, 1]). A weighted averaging may then be performed on the respective grade components in order to generate a final recommendation grade. In an implementation, the grade component weights may be A/B tested in order to identify an optimal result for each site. In an implementation, each web site may have different parameter values.

According to implementations of the present disclosure, the personalized content recommendations may be generated at various different levels, including, but not limited to, on a per publisher basis, for a set of publishers, for different "personalities" of a user (e.g., a long-term "character" of a user over a period of time, a short-term "mood" of the user in a current session, etc.), etc. The recommendation module may be configured to filter the user-specific data in order to identify patterns in the user's interests based on a time of day or a day of the week. For example, a user may have a "weekend" personality wherein user-specific data relating to the user's weekend activities is collected and analyzed in generating one or more feature vectors. Similarly, a user may have a "weekday" personality generated based on the user's data relating to weekday activities. In an implementation, a "time of day" may be considered in generating a personalized content recommendation, wherein certain candidate recommendations (e.g., video-based content) may have a higher user engagement indicator in the evenings or on the weekends.

With reference to FIG. 4, in block 407, one or more personalized content recommendations are identified for a target user and/or a cluster of users based on the calculated grades for the multiple candidate recommendations. In an implementation, a graded list of possible personalized content recommendations may be generated for each target user and/or each cluster of users, wherein the list is ranked based on the grades determined for the multiple candidate recommendations. In an implementation, the recommendation module is configured to identify the one or more personalized content recommendations for each cluster/user as a function of the determined grade (e.g., a probability of serving a candidate recommendation≈the calculated grade^X, wherein X is a value greater than 0).

According to implementations of the present disclosure, the recommendation module loads and caches the identified personalized content recommendations (e.g., in the form of graded list) for each user/cluster in one or more scopes (e.g., a per publisher scope, a per publisher set scope, a network-wide scope). In an example, the personalized content recommendations are cached in LFU-based memory caches backed up by a persistent NoSQL data store (e.g., an Apache Cassandra NoSQL data store).

In an implementation, collected "personal" information associated with a target user (e.g., the categories a target user prefers, the sources a target user prefers, the languages a target user prefers, the content types (e.g., video, audio) the target user prefers, the document properties (e.g., long documents, short documents, etc.) a target user prefers) may be used to refine the list of personalized content recommendations generated in block 407. The personal information may serve as a "hint" to re-weight the grades associated with the candidate recommendations on the graded list. In an example, the personal information may be used to reduce a grade associated with certain candidate recommendations relating to categories that the target user does not prefer or increase a grade associated with certain candidate recommendations relating to categories that the target user prefers.

In an implementation, another type of personalized content recommendation may be generated by the recommendation module based on a matching a user's interest and particular content (referred to as "content-based recommendations"). Given a set of user interests/features identified for a target user (e.g., User A likes arts, sports, long documents, does not like video, likes English and Spanish, etc.), the recommendation module may generate a content-based recommendation including these features having a highest user engagement value (e.g., a highest CTR value, a highest RPM value, etc.). For example, a user having an interest in content categories X and Y are provided with content-based recommendations having a highest user engagement value (e.g., a highest CTR) for category X and category Y.

In an implementation, the recommendation module may determine a vector representing the user's interests/features based on the collected user-specific data (herein referred to as a "user vector"). In an implementation, the user vector may be the same as the feature vector used in generating clusters, as described above in detail. The user vector may be generated on a per user basis, and need not be generated at a cluster-level. The content-based recommendations may appear to a user to be more "personal" since the personalized content recommendation based on a content-based recommendation is based on the user's contextual interests.

In an implementation, the recommendation module may generate both cluster-based personalized content recommendations (as described above in connection with FIGS. 3-4) and content-based recommendations for a user or set of users.

According to implementations of the present disclosure, the recommendation module may be configured to explore candidate recommendations in one or more different clusters to determine a level of user engagement (also referred to as "personal exploration"). For example, the recommendation module may be configured to estimate a CTR value for a candidate recommendation by testing the candidate exploration recommendations as personalized content recommendations for a cluster of users a number of times in order to collect sufficient data (e.g., 500 to 10,000 impressions). In this implementation, the recommendation module may assign a weight to the impressions of the test candidate recommendations in the cluster equivalent to a current expected CTR for these recommendations. In an example, if certain exploration recommendations succeed in a particular cluster, those exploration recommendations may be served to more users in that cluster. In an implementation, the exploration weight may be dependent on an estimate of the exploration recommendation success in that cluster. In an implementation, the recommendation module may identify a candidate exploration recommendation for testing purposes by identifying candidate recommendations which are visited by a large number of users in a particular cluster relative to a number of visits by the "general population" (e.g., other users not in the particular cluster). In an implementation, a content-based recommendation (e.g., a recommendation based on a particular user's specific interests) may be used as candidate exploration recommendations for testing purposes for a particular cluster (e.g., a cluster of users including the particular user).

Figure 5:
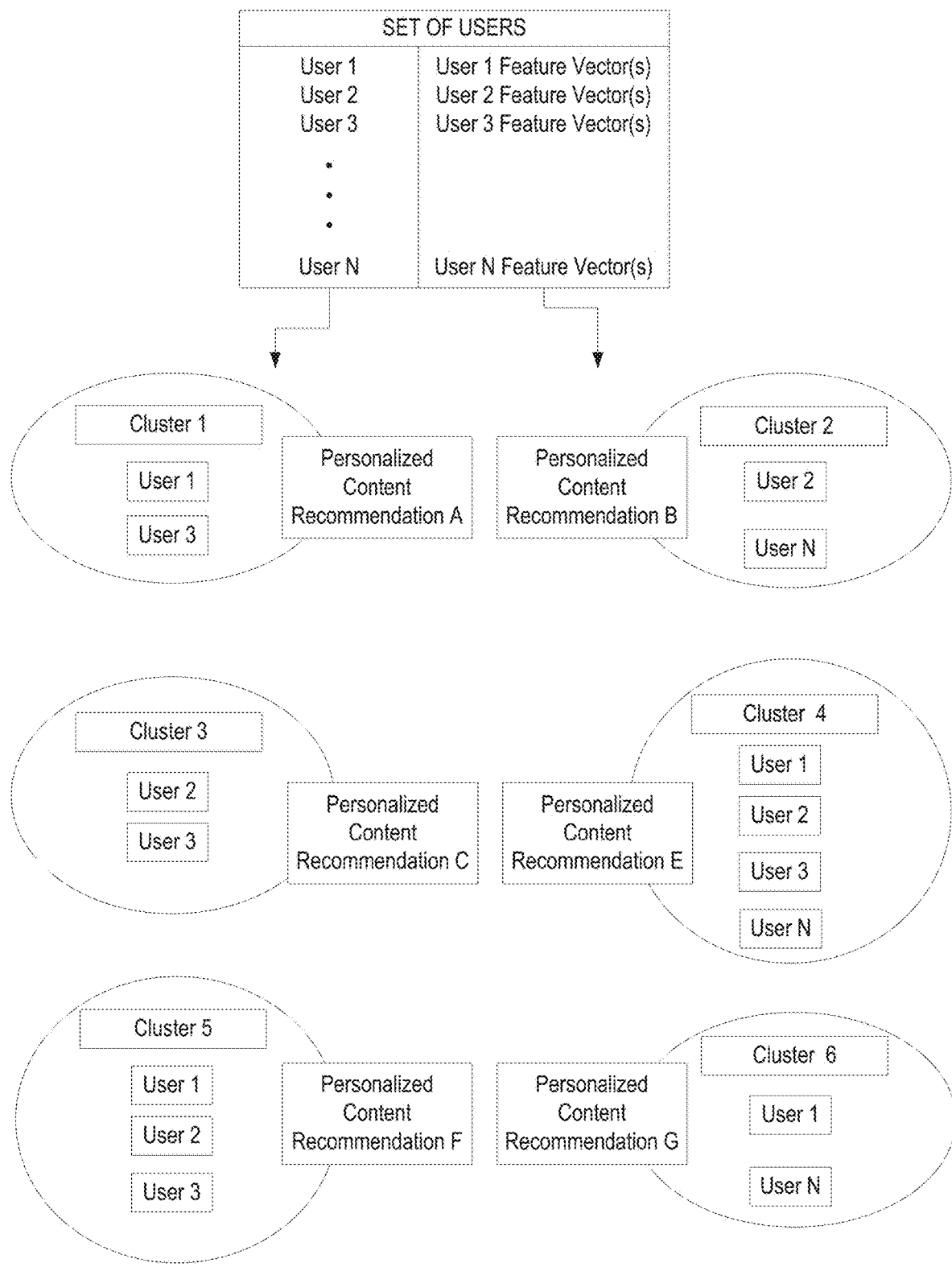
FIG. 5 illustrates an example of user clusters with personalized content recommendations assigned to them, according to various implementations.

An example of the generated clusters (e.g., clusters 1-6) including groupings of a set of users (e.g., users 1-N) with assigned personalized content recommendations (e.g., personalized content recommendations A-G) is shown in FIG. 5. As illustrated in FIG. 5, one or more feature vectors are generated for the set of users and the users are assigned or grouped within one or more clusters based on the feature vectors. As shown, following the generation of the clusters, one or more personalized content recommendations are assigned to each cluster. It is noted that the personalized content recommendations shown in FIG. 5 may include a list of multiple personalized recommendations. In an implementation, the personalized content recommendations shown in FIG. 5 may include a ranked list of multiple personalized recommendations. In an example, if user 3 is identified as a target user for provisioning of a content recommendation, the recommendation module may identify the clusters to which user 3 belongs (e.g., clusters 1, 3, 4 and 5) and identify the associated one or more personalized content recommendations (e.g., personalized content recommendation A, C, E, and F). In an implementation, the recommendation module may generate a ranked list of the personalized content recommendations for user 3.

Figure 6:
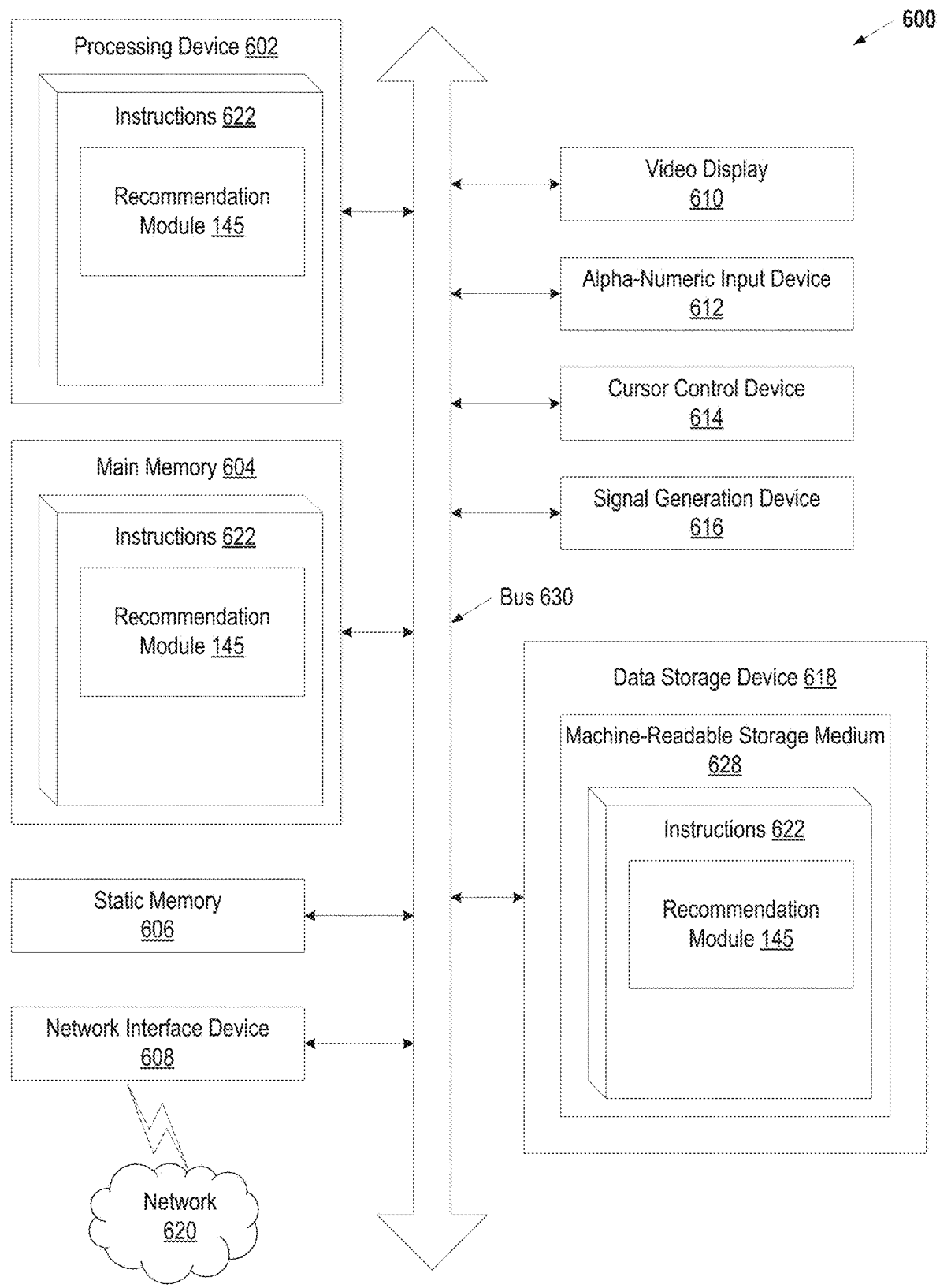
FIG. 6 is a block diagram of an example computer system that may perform one or more of the operations described herein, in accordance with various implementations.

FIG. 6 is a block diagram of an example computer system 600 that may perform one or more of the operations described herein, in accordance with various implementations In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (e.g., a processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 614, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 622 for performing the operations and steps discussed herein.

The computer system 600 may further include a network interface device 704. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 614 may include a computer-readable storage medium 624 on which is stored one or more sets of instructions 622 (e.g., software) embodying any one or more of the methodologies or functions described herein. The instructions 622 may also reside, completely or at least partially, within the main memory 604 and/or within the processor 602 during execution thereof by the computer system 600, the main memory 604 and the processor 602 also constituting computer-readable storage media. The instructions 622 may further be transmitted or received over a network 620 via the network interface device 608.

In one implementation, the instructions 622 include instructions for an optimization module (e.g., recommendation module 145 in FIG. 1) and/or a software library containing methods that call the optimization module. While the computer-readable storage medium 628 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "collecting", "establishing", "generating", "identifying", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

The terms "first", "second", "third", "fourth", etc. as used herein are meant as labels to distinguish among different elements and may not necessarily have an ordinal meaning according to their numerical designation.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    collecting, via a network, user data associated with a plurality of users, wherein the user data comprises information relating to web-based interactions with content by the plurality of users;
    assigning a weight to each of the web-based interactions of the user data in view of an age of the web-based interactions;
    defining a plurality of user cluster types, wherein each user cluster type is associated with one or more interest categories;
    generating, for each of the plurality of users, a vector representation corresponding to each of the plurality of user cluster types, wherein the vector representation comprises a weighted value representing an interest level of a user corresponding to each of the one or more interest categories associated with each user cluster type;
    normalizing the vector representation based on an editorial bias representing a level of consumption of content associated with the one or more interest categories as a function of placement of the content on a webpage;
    determining a portion of the user data matches a first vector representation associated with a first cluster type based at least in part on the weight assigned to the web-based interactions, the first vector representation comprising a first weighted value for a first interest category associated with the first cluster type;
    defining a first cluster comprising a first plurality of users of the plurality of users, wherein the first plurality of users are associated with the first user data;
    generating a plurality of grades for a plurality of content recommendations, wherein a first grade of the plurality of grades is based on one or more user engagement indicators associated with the first plurality of users in the first cluster and a first content recommendation of the plurality of content recommendations;
    identifying, based on a comparison of the plurality of grades, the first content recommendation to provision to the first cluster, wherein the first grade corresponds to a first engagement level of the first cluster as it relates to the first content recommendation;
    loading, into a memory, the first content recommendation in association with the first cluster and a first publisher; and
    in response to a target user included in the first cluster accessing a webpage provided by the first publisher:
        adjusting the first grade associated with the first content recommendation and the first cluster comprising the first plurality of users based on user property data, user-specific action data and non-action data associated with the target user, wherein the user property data comprises a geographic location of the target user, wherein the action data identifies a plurality of web-based activities executed by the target user, and wherein the non-action data identifies passively generated data comprising information associated with the target user viewing a content link with no interaction with the content link; and
        populating, in view of the first grade, a first designated portion of the webpage accessed by the target user with the first content recommendation associated with the first cluster.

2. The method of claim 1, further comprising determining a quantity of visits to the first content recommendation by users in the first cluster, wherein the first grade for the first content recommendation for the first cluster is based on the quantity of visits.

3. The method of claim 1, further comprising identifying the first content recommendation for the target user based on user-specific data associated with the target user identified from the user data.

4. A system comprising:
    a memory to store instructions; and
    a processing device coupled with the memory, the processing device configured to execute the instructions to:
    collect, via a network, user data associated with a plurality of users, wherein the user data comprises information relating to web-based interactions with content by the plurality of users;
    assign a weight to each of the web-based interactions of the user data in view of an age of the web-based interactions;
    define a plurality of user cluster types, wherein each user cluster type is associated with one or more interest categories;
    generate, for each of the plurality of users, a vector representation corresponding to each of the plurality of user cluster types, wherein the vector representation comprises a weighted value representing an interest level of a user corresponding to each of the one or more interest categories associated with each user cluster type;
    normalize the vector representation based on an editorial bias representing a level of consumption of content associated with the one or more interest categories as a function of placement of the content on a webpage;
    determine a portion of the user data matches a first vector representation associated with a first cluster type based at least in part on the weight assigned to the web-based interactions, the first vector representation comprising a first weighted value for a first interest category associated with the first cluster type;
    define a first cluster comprising a first plurality of users of the plurality of users, wherein the first plurality of users are associated with the first user data;
    generate a plurality of grades for a plurality of content recommendations, wherein a first grade of the plurality of grades is based on one or more user engagement indicators associated with the first plurality of users in the first cluster and a first content recommendation of the plurality of content recommendations;
    identify, based on a comparison of the plurality of grades, the first content recommendation to provision to the first cluster, wherein the first grade corresponds to a first engagement level of the first cluster as it relates to the first content recommendation;

load, into a memory, the first content recommendation in association with the first cluster and a first publisher; and in response to a target user included in the first cluster accessing a webpage provided by the first publisher:

adjust the first grade associated with the first content recommendation and the first cluster comprising the first plurality of users based on user property data, user-specific action data and non-action data associated with the target user, wherein the user property data comprises a geographic location of the target user, wherein the action data identifies a plurality of web-based activities executed by the target user, and wherein the non-action data identifies passively generated data comprising information associated with the target user viewing a content link with no interaction with the content link; and populate, in view of the first grade, a first designated portion of the webpage accessed by the target user with the first content recommendation associated with the first cluster.

5. The system of claim 4, the processing device further configured to:

determine a quantity of visits to the first content recommendation by users in the first cluster, wherein the first grade for the first content recommendation for the first cluster is based on the quantity of visits.

6. The system of claim 4, the processing device further configured to:

identify the first content recommendation for the target user based on user-specific data associated with the target user identified from the user data.

7. A non-transitory computer readable storage medium comprising instructions thereon that, in response to execution by a processing device, cause the processing device to perform operations comprising:

collecting, via a network, user data associated with a plurality of users, wherein the user data comprises information relating to web-based interactions with content by the plurality of users;

assigning a weight to each of the web-based interactions of the user data in view of an age of the web-based interactions;

defining a plurality of user cluster types, wherein each user cluster type is associated with one or more interest categories;

generating, for each of the plurality of users, a vector representation corresponding to each of the plurality of user cluster types, wherein the vector representation comprises a weighted value representing an interest level of a user corresponding to each of the one or more interest categories associated with each user cluster type;

normalizing the vector representation based on an editorial bias representing a level of consumption of content associated with the one or more interest categories as a function of placement page;

determining a portion of the user data matches a first vector representation associated with a first cluster type based at least in part on the weight assigned to the web-based interactions, the first vector representation comprising a first weighted value for a first interest category associated with the first cluster type;

defining a first cluster comprising a first plurality of users of the plurality of users, wherein the first plurality of users are associated with the first user data;

generating a plurality of grades for a plurality of content recommendations, wherein a first grade of the plurality of grades is based on one or more user engagement indicators associated with the first plurality of users in the first cluster and a first content recommendation of the plurality of content recommendations;

identifying, based on a comparison of the plurality of grades, the first content recommendation to provision to the first cluster, wherein the first grade corresponds to a first engagement level of the first cluster as it relates to the first content recommendation;

loading, into a memory, the first content recommendation in association with the first cluster and a first publisher; and in response to a target user included in the first cluster accessing a webpage provided by the first publisher:

adjusting the first grade associated with the first content recommendation and the first cluster comprising the first plurality of users based on user property data, user-specific action data and non-action data associated with the target user, wherein the user property data comprises a geographic location of the target user, wherein the action data identifies a plurality of web-based activities executed by the target user, and wherein the non-action data identifies passively generated data comprising information associated with the target user viewing a content link with no interaction with the content link; and populating, in view of the first grade, a first designated portion of the webpage accessed by the target user with the first content recommendation associated with the first cluster.

8. The non-transitory computer readable storage medium of claim 7, the operations further comprising:

determining a quantity of visits to the first content recommendation by users in the first cluster, wherein the first grade for the first content recommendation for the first cluster is based on the quantity of visits.

9. The non-transitory computer readable storage medium of claim 7, the operations further comprising:

identifying the first content recommendation for the target user based on user-specific data associated with the target user identified from the user data.

* * * * *